(12) United States Patent
Ruetschi et al.

(10) Patent No.: US 12,069,008 B2
(45) Date of Patent: *Aug. 20, 2024

(54) APPARATUS AND METHOD FOR SUBSCRIPTION TO A SERVICE AND USE OF THE SERVICE

(71) Applicant: RingCentral, Inc., Belmont, CA (US)

(72) Inventors: Johannes Ruetschi, Boca Raton, FL (US); Rodrigo Pastro, Lake Worth, FL (US); Viraj Puranik, Boca Raton, FL (US); Christian Garbin, Boca Raton, FL (US)

(73) Assignee: RINGCENTRAL, INC., Belmont, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 16/816,768

(22) Filed: Mar. 12, 2020

(65) Prior Publication Data

US 2020/0213250 A1 Jul. 2, 2020

Related U.S. Application Data

(63) Continuation of application No. 16/188,971, filed on Nov. 13, 2018, now Pat. No. 10,630,612, which is a
(Continued)

(51) Int. Cl.
*H04L 67/148* (2022.01)
*H04L 51/00* (2022.01)
(Continued)

(52) U.S. Cl.
CPC ............ *H04L 51/00* (2013.01); *H04L 67/148* (2013.01); *H04L 67/306* (2013.01); *H04L 67/51* (2022.05)

(58) Field of Classification Search
CPC ..... H04L 51/00; H04L 67/148; H04L 67/306; H04L 67/51
(Continued)

(56) References Cited

U.S. PATENT DOCUMENTS

| 8,213,423 B1 | 7/2012 | Breau et al. |
| 2002/0038371 A1 | 3/2002 | Spacey |

(Continued)

OTHER PUBLICATIONS

"Digital Cellular Telecommunications System (Phase 2+); Universal Mobile Telecommunications System (UMTS); LTE; IP Multimedia Subsystem (IMS); Stage 2 (3GPP TS 23.228 version 9.4.0 Release 9)". Technical Specification, European Telecommunications Standards Institute (ETSI), 650, Route Des Lucioles; F-06921 Sophia-Antipolis; France, vol. 3GPP SA 2, No. V9.4.0, Oct. 1, 2010.
(Continued)

*Primary Examiner* — Meng Vang
(74) *Attorney, Agent, or Firm* — FINNEGAN, HENDERSON, FARABOW, GARRETT & DUNNER LLP (57) ABSTRACT

An apparatus and mechanism to subscribe to a single address and or session management service from multiple devices (such as e.g. tablets, smart phones, netbooks or other types of communication terminals or client devices) with a single account and password through the automatic assignment of a dynamic opaque service profile to each device a user uses to sign in to the service. After sign-in transparent call management services are provided to the user and allow the user to control sessions on any signed-in device from any signed-in device without revealing the distinct dynamic opaque service profiles to the user.

20 Claims, 5 Drawing Sheets

Related U.S. Application Data continuation of application No. 13/878,788, filed as application No. PCT/US2011/060775 on Nov. 15, 2011, now Pat. No. 10,164,917.

(60) Provisional application No. 61/419,400, filed on Dec. 3, 2010.

(51) Int. Cl.
*H04L 67/306* (2022.01)
*H04L 67/51* (2022.01)

(58) Field of Classification Search
USPC ........................................................ 709/206
See application file for complete search history.

(56) References Cited

U.S. PATENT DOCUMENTS

| | | | | |
|---|---|---|---|---|
| 2003/0235176 | A1* | 12/2003 | Zhang | H04L 29/06 370/338 |
| 2004/0003292 | A1* | 1/2004 | Kato | H04L 61/2514 726/28 |
| 2005/0038848 | A1* | 2/2005 | Kaluskar | H04L 67/148 709/201 |
| 2006/0235982 | A1* | 10/2006 | Koshino | H04N 21/6125 709/227 |
| 2007/0060042 | A1 | 3/2007 | Ko | |
| 2007/0172065 | A1 | 7/2007 | Lee et al. | |
| 2007/0299941 | A1* | 12/2007 | Hietasarka | H04L 29/12594 709/245 |
| 2009/0157799 | A1* | 6/2009 | Sukumaran | H04L 67/306 709/203 |
| 2009/0210536 | A1* | 8/2009 | Allen | H04L 65/1094 709/227 |
| 2010/0011108 | A1* | 1/2010 | Clark | H04W 76/40 709/227 |
| 2011/0185070 | A1 | 7/2011 | Xue et al. | |
| 2011/0282931 | A1* | 11/2011 | Chen | H04L 61/605 709/245 |
| 2012/0011261 | A1* | 1/2012 | Hirano | H04L 65/1066 709/228 |
| 2012/0064887 | A1* | 3/2012 | Shobatake | H04L 12/2812 455/432.1 |
| 2012/0110198 | A1* | 5/2012 | Sasaki | G06F 21/105 709/229 |
| 2013/0013698 | A1 | 1/2013 | Relyea et al. | |
| 2013/0019003 | A1 | 1/2013 | Bouvet | |
| 2013/0142166 | A1 | 6/2013 | Bogineni et al. | |
| 2013/0290494 | A1* | 10/2013 | Goudarzi | H04L 65/1069 709/219 |

OTHER PUBLICATIONS

"Service Mobility with SIP, SDP and MPEG-21". Telecommunications, 2007. Contel 2007, 9th International Conference Jun. 1, 2007.
International Search Report for PCT/US2011/060775 dated Mar. 1, 2012.
Written Opinion of the International Searching Authority for PCT/US2011/060775 dated Mar. 1, 2012.
International Preliminary Report on Patentability a for PCT/US2011/060775 dated Jun. 4, 2013.

* cited by examiner

```
Mobile Client                                                          Service
1)      | Notify sip:singleaddress                                        |
        | From:singleaddress                                              |
        | To:singleaddress                                                |
        | Content-Type:x-siemens-mobile                                   |
        | Body:                                                           |
        | <GetDynamicProfile>                                             |
        |   <... mobile device client data ..>                            |
        | </GetDynamicProfile>                                            |
        |---------------------------------------------------------------->|
        |                                                                 |
        | 401 / Notify sip:singleaddress ...                              |
        |<--------------------------------------------------------------->|
        |                                                                 |
        | 200 OK                                                          |
        | Body:                                                           |
        | <GetDynamicProfileResponse>                                     |
        |    <Address>dynamicaddress</Address>                            |
        |    <... server provided config. data ...>                       |
        | </GetDynamicProfileResponse>                                    |
        |<----------------------------------------------------------------|
        |                                                                 |
2)      | Register sip:dynamicaddress                                     |
        | From: dynamicaddress                                            |
        | To:   dynamicaddress                                            |
        | ...                                                             |
        |---------------------------------------------------------------->|
        |                                                                 |
        | 401 / Register sip:dynamicaddress ... /200                      |
        |<--------------------------------------------------------------->|
```

FIGURE 1A

```
Mobile Client                                                    Service
3)       |                                                          |
3a)      | Notify sip:dynamicaddress                                |
         | From: dynamicaddress                                     |
         | To: dynamicaddress                                       |
         | Content-Type: application/csta+xml                       |
         | <GetSnapShotDevice>                                      |
         |    <SnapShotObject>singleaddress</SnapShotObject>        |
         |    ...                                                   |
         | </GetSnapShotDevice>                                     |
         |--------------------------------------------------------->|
         |                                                          |
         | 200 OK                                                   |
         | Content-Type: application/csta+xml                       |
         | Body:                                                    |
         | <GetSnapShotDeviceResponse>                              |
         |   ...                                                    |
         |   <connectionIdentifier>                                 |
         |     <callID>FF0002000000000</callID>                     |
         |
<deviceID>singleaddress;ond=otherdynamicaddress</deviceID>
         |   </connectionIdentifier>                                |
         |   ...                                                    |
         | </GetSnapShotDeviceResponse>                             |
         |<---------------------------------------------------------|
         |                                                          |
3b)      | Notify sip:dynamicaddress                                |
         | From: dynamicaddress                                     |
         | To: dynamicaddress                                       |
         | Content-Type: application/csta+xml                       |
         |   <SingleStepTransferCall>                               |
         |     <activeCall>                                         |
<deviceID>singleaddress;ond=otherdynamicaddress</deviceID>
         |       <callID>FF0002000000000</callID>                   |
         |     </activeCall>                                        |
         |
<transferredTo>singleaddress;ond=otherdynamicaddress</transferredTo>
         |     ... private data - auto answer ...                   |
         |   </SingleStepTransferCall>                              |
         |--------------------------------------------------------->|
         |                                                          |
         | 200 OK                                                   |
         | Content-Type: application/csta+xml                       |
         | Body:                                                    |
         | <SingleStepTransferCallResponse>                         |
         |<---------------------------------------------------------|
```

Client authenticates with a server hosting a service using a single address service account. As part of the authentication signaling the client device provides its routable address to the server. The automatic configuration exchange may not require any user input or may merely require input from the user to actuate a particular application to be run by the client.

↓

Upon a successful authentication, the server sends to the client a dynamically assigned service profile. The service profile may be a server profile for the server. The dynamic service profile may contain an SIP identity which may be referred to as a dynamic address.

↓

The client uses the dynamic service profile received from the service to register with the service. In so doing, the client may respond to service challenges during the registration with the credentials from the single address service account.

↓

The server binds the dynamic account to the user's single address service identity. The binding process creates a compound address that contains both the dynamic address and the single address, which may allow the user to receive sessions such as voice calls, video calls, or instant messaging (IM) sessions made to his single address via the client. The user may also initiate sessions from the registered device and present the single address identity to the connected parties. It also allows the service to independently control each of the user's devices that subscribed to the service using the new compound address. If the server supports third party call control procedures, the client application run by the user's client device can control each of the subscribed devices from any subscribed device via this new compound address.

↓

The client manages sessions active on the client as well as sessions that are active on other devices that the user has also subscribed to the single address service. Using a third party session control mechanism such as, for example, uaCSTA, the client can identify and control these sessions. The client can query and monitor all sessions using the user's "single address", and can identify on which devices these sessions are active.

↓

The client may move a session seamlessly from itself to another device the user registered using with the server.

FIGURE 4

APPARATUS AND METHOD FOR SUBSCRIPTION TO A SERVICE AND USE OF THE SERVICE

CROSS REFERENCE TO RELATED APPLICATIONS

The present application is a continuation application of U.S. patent application Ser. No. 16/188,971, which claims priority to U.S. patent application Ser. No. 13/878,788, which is the United States national phase under 35 U.S.C. § 371 of PCT International Application No. PCT/US2011/060775, filed on Nov. 15, 2011 and claiming priority to U.S. Provisional Patent Application No. 61/419,400, filed on Dec. 3, 2010. The entirety of U.S. Provisional Patent Application No. 61/419,400 is incorporated herein by reference.

FIELD OF THE INVENTION

The present invention relates to communication systems and, more particularly, to a communication system, a communication device and application for such a device that permits a user to control communication sessions from any of a number of devices by utilizing a service. Examples of communication devices may include computers, cellular phones, tablets, desktop computers, laptops, personal digital assistants, or other terminal devices that utilize one or more processors that run programs stored on memory connected to the one or more processors to permit communication services to be provided to a user. The service may be hosted by at least one server.

BACKGROUND OF THE INVENTION

People often engage in communication sessions with other people in conference sessions. For instance, users may participate in group text messaging sessions, or instant messaging sessions. As another example, users may participate in conference calls that include audio or video and audio communications using phones such as cellular phones or computers. In other circumstances, a user may have a communication session that involves only communicating with one other person in a phone call or via text messaging or via a video/audio communication connection using cellular phones or computers. The connections between the users may be established over one or more networks. One example of a combined video and audio communication is a face time connection using iPhone cellular phones made by Apple. Another example of such a communication is a video conference utilizing a camera connected to a computer having a network connection with at least one other communication session participant.

A user may participate in a communication session with one or more other people via their different communication devices. In some circumstances, a user may use a non-mobile device, such as a desktop computer or desktop phone, to participate in such a session. While the session is in progress, something may occur that requires the user to move to a new location. Traditionally, that user would have to end his or her participation in that session using the desktop computer and use another device to rejoin the session. For instance, if the communication session was a conference call, the user would have to rejoin the communication session using a different device, such as a mobile phone to continue to participate in the communication session.

The leaving or reentering of the session is typically undesirable as it creates a delay in the ongoing communication session and can make other participants wait for the user to rejoin the session. In some circumstances, such an occurrence may require all the users to terminate their involvement in the session and then reinitiate a new session to accommodate the needs of that one user.

Additionally, joining with a different device may expose a different contact address to the conference participants. For example, a user disconnecting from a wired phone and rejoining a conference with a cell phone could expose both his wired phone number and cell phone number to the participants. If one of the conference participants subsequently needs to contact this user, he or she may not know which phone number to use.

A new device or system is needed to permit a user to control how a user may participate in a communication session. Preferably, the new device or system permits a user to utilize a service that allows the user to more easily change the device used to participate and communicate in a communication session without requiring that user to terminate his or her involvement in an ongoing communication session or rejoin that session using another device and at the same time automatically expose a single contact address to his communication peers independently of the device being used.

SUMMARY OF THE INVENTION

A communication system is provided that includes a first communication terminal associated with a user and a server that hosts a service. The first communication terminal is connectable with the server to provide a first message to the server to register with the server so that the service is usable by the user via the first communication terminal. The first message has user data related to a user account for the use of the service and at least one routable address of the first communication terminal. The server assigns a service address to the first communication terminal and associates the service address with a primary address assigned to the user. The server subsequently sends a registration response to: the first communication terminal to identify at least one of the service address and the primary address to the first client device such that the registration response provides the first client device with information necessary for communication to the server for using the service.

In some embodiments of the system, both the service address and the primary address may be included in the registration response. For instance, the registration response may include a compound, address that includes both the primary address and service address. The compound address may be associated with the first communication terminal by the server.

The server may send communication session data to the first communication terminal. The communication session data may concern active communication sessions involving the user on devices associated with the user for use via the service provided by the server. The sending of the communication session data may occur after the first communication terminal is registered to use the service offered by the server.

At least one mutable address of the first communication terminal may be provided in a message based on data stored on the non-transitory memory of the first communication terminal. Alternatively, user input may be provided that provides at least one routable address. The user input may be stored on the non-transitory memory or may be in the cache of the first communication terminal.

In some embodiments of the system, the service address may be a dynamic address assigned by the server to the first communication terminal. The dynamic address can be used by the first communication terminal when communicating with the server to use the service offered by the server.

The server may be configured to confirm that a license is available to the user prior to sending the registration response to the first communication terminal. If a license is not available, the server may not send the registration response or may send a message to the first communication terminal seeking input from the user for payment information so that the user may obtain another license. The service level and features provided by the service may also be determined with the license assigned to the primary or dynamic service address.

After the first communication terminal is registered with the service hosted by the server, the server may send one or more messages to the terminal identifying at least one active communication session associated with the user. The one or more active communication sessions can utilize the first communication terminal or other devices associated with the user that are registered for using the service hosted by the server. The first communication terminal may subsequently send one or more active communication session move request messages to the server that identify a device associated with the user to which an active communication session should be moved while that session is still ongoing. The server may receive the one or more active communication session move request messages and effect the move to the identified device. The move request message may include the compound address of the device to which the session is to be moved.

A method for registering a communication device with a service for using the service to move an active communication session associated with a user is also provided. The method may include a server hosting a service and a first communication device sending a registration request message to the server to register with the server. In response to the registration message, the server may associate the first communication device with the user and assign a service address to the first communication device and associate the service address with the first communication device and the user. The server may send a registration response message to the first communication device that identifies the service address so that the first communication device is connectable to the server for using the service via use of the service address.

The method may also include other steps. For instance, the server may also confirm that a license is available for the user for registering the first communication device prior to sending the registration response message. The registration response message may be a service profile or a SIP service profile.

Other steps that may be utilized in embodiments of the method include the server sending one or more messages to the first communication device that identify at least one active communication session associated with the user after the first communication device is registered with the service. The first communication device may send at least one active communication session move request message to the server that identifies a device associated with the user to which the at least one active communication session is to be moved while that session is ongoing. The server may receive the at least one active communication session move request message and effect a move of the active communication session to the device associated with the user identified in that at least one move request message.

A non-transitory computer readable medium is also provided. The non-transitory computer readable medium may have code stored thereon that defines a method to be run by a computer device that processes the code. The method defined by the code may include a first communication device communicating output to a user to obtain input for including in a registration request message to be sent to a server that hosts a service, the first communication device sending the registration request message to the server to register with the server, and the first communication device receiving a registration response message from the server identifying a service address assigned to the first communication device such that the first communication device is connectable to the server for using the service hosted by the server by using the service address. The service address may comprise a compound address having a primary address associated with a user and a dynamic address assigned by the server.

Embodiments of the non-transitory computer readable medium may be, for example, memory of a computer device, such as a communication device or communication terminal, a flash drive, memory of a server, flash memory, a compact disc, an optical disc storage media, or a DVD. Embodiments of the first client device or second client device may be, for example, an SIP endpoint or communication terminal such as, for example, a mobile phone, a computer, a laptop, a personal digital assistant, a netbook, or a tablet computer device. Embodiments of the server may be, for example, a computer device configured to host a service to a plurality of different client devices by communicating with the client devices.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and apparatuses for controlling sessions from one or more devices are shown in the accompanying drawings and certain present preferred methods of practicing the same are also illustrated therein. It should be understood that like reference numbers used in the drawings may identify like components.

FIG. 3 is a flow chart illustrating a present preferred method of subscribing to a service and using that service.

DETAILED DESCRIPTION OF PRESENT PREFERRED EMBODIMENTS

Embodiments of the apparatus for subscribing a single address and/or session management service to multiple devices with a single account and password through an automatic assignment of a dynamic opaque SIP service profile to each device a user uses to sign-in to the service are discussed more fully below. Examples of devices a user may use to sign in to the service may include, for example, tablets, smart phones, netbooks, or other computer devices or mobile computer devices such as laptops, computers, cellular phones, communication terminals and mobile communication terminals. The service may be provided via one or more servers. The at least one server may be one or more workstations, or one or more other computer devices that are configured to host a service to a plurality of communication terminals, or client devices.

It should be appreciated that the communication terminals, client devices and computer devices may each be a device that has one or more processor platforms such as microcontrollers, microprocessors, or other processor elements and may also have memory such as non-transitory memory that is connected to the processor platforms. Each device may also have one or more interfaces for connecting to different devices or communicating with those devices. For instance, each device may have a wireless interface for forming wireless connections with other devices and may also have an interface configured to permit a wired connection between the device and another device. Additionally, each device may include programs or applications that are stored in the memory of the device and run by the one or more processor platforms. The memory may be non-transitory memory. The programs may define steps of a method that the devices run or process.

The devices may include remote power sources such as batteries that power the devices. The devices may also be configured to be connected to a power source via a wired connection, such as a plug-in connection. Each of the devices may include one or more displays and may include one or more input devices such as readers, touch screens, scanners, keyboards, a computer mouse, a key pad, or other input device.

A user of a communication terminal or client device, such as a cellular phone, may acquire a client application from a public or private application store via a download of the application from a remote server or computer device. The download of the client application may be performed via a wireless connection to that remote server. The wireless connection may include a connection that traverses one or more networks such as the internet. The client application may then be started on the user's client device that downloaded the client application to permit the user to subscribe to a service through a sign-in procedure defined by that client application. The procedure may require the user to enter his or her user account information and a password as input. The user account information may include a name or code assigned to the user account and the password may be a code such as a string of letters, numbers and/or symbols. The user account information and password may be transmitted by the user's device to the service. No further information may be necessary to be entered by the user to sign in.

The service may enable the device to access and use the service in response to receipt of the user's subscription information by the service. It should be appreciated that such information may be transmitted via one or more messages sent from the user's device to a server hosting the service. The information may be provided by the user as input in response to one or more prompts created by the application that is displayed or output to the user via the user' device running the application. Alternatively, the information may be provided in response to one or more prompts or queries provided by the service that is received by the user's device and subsequently outputted to the user.

The running of the sign-in procedure at a particular device may automatically provision that device for the service and enable the device to be used to make and receive multi-modal real time sessions with a single address assigned to the user. The service may allocate that address to the machine upon the signing in with the service via the sign-in procedure performed by the communication terminal or client device.

It should be appreciated that the service can also be used for advanced features such as using one device to control sessions on another device while the user only has to be aware of his or her single address identity used to sign-in to the service. Such functionality simplifies the data a user must know and provide to different devices to control ongoing communication sessions being participated in using different devices.

During the sign-in procedure, the service is configured to automatically provision the client device with a dynamically assigned opaque device profile. This dynamic opaque profile assignment may provide a plurality of functions. For example, the assigned profile may provision the device such that the client device is provisioned with all needed SIP parameters to make and receive multiple media sessions, the ability to select a SIP profile out of a dynamically licensed pool of profiles, the ability to create a unique application address binding between the single address and the dynamic profile address to allow the user to seamlessly control communication sessions on a signed in device from any of the signed in devices, and the ability to provide opacity by completely hiding this procedure and it's complexity from the user including the address of the dynamic SIP profile. The hiding of the procedure permits the user to have an experience of having seamless control over his or her different devices without being troubled with addressing the complex requirements often associated with managing multiple devices, which may provide an excellent user experience.

Examples of sign-in steps performed by a communication terminal and the dynamic profile assignment provided by the service are outlined below. First the client authenticates with the server using a single address service account. As part of the authentication signaling the client device provides its routable address to the server. For example, if the client is a smart phone, the routable address may be the cell phone number. As another example, if the client is a laptop or a computer, the routable address may be an IP address or a network address assigned to the device. The routable address may be automatically read from an application or memory of the device via the sign-in application run by the device. The automatic configuration exchange may not require any user input.

Upon a successful authentication, the service sends to the client a dynamically assigned service profile. If the service is offered by one or more servers, the service profile may be a server profile. The dynamic service profile may contain a SIP identity which may be referred to as a dynamic address. One possible implementation or embodiment for this first step is to use a SIP Subscribe/Notify handshake with an XML body containing the configuration data.

In the second step the client may use the dynamic service profile received from the service to register with the service. Since the service assigned the dynamic profile to the user's single address service account, the client responds to service challenges during the registration with the credentials from the single address service account. The service binds the dynamic account to the user's single address service identity. The binding process creates a compound address that contains both the dynamic address and the single address, which may allow the user to receive sessions such as voice calls, video calls, or instant messaging (IM) sessions made to his single address. It also helps allow the user to initiate sessions from the registered device and present its single address identity to his connected parties via the registered device, it also allows the service to independently control each of the user's devices that subscribed to the service using the new compound address. One example of the compound address may be an address defined as: <single address|dynamic address>. If the session management service supports third party call control procedures, the client application run by the user's client device can control each of the subscribed devices from any subscribed device via communications sent to the service and the use of this new compound address.

It should be understood that the new compound address may be stored and managed by the service and may be controlled by the client device via communications the client sends to the service that requires the service to utilize the compound address. Alternatively, it is contemplated that the compound address may be communicated to the client device such that the client device can control other client devices utilizing the compound address either directly or in connection with communications sent to the service.

In a third step the client device can manage sessions active on its device as well as sessions that are active on other devices that have also subscribed to the single address service. Using a third party session control mechanism such as, for example, uaCSTA (User Agent Computer Supported Telecommunications Applications), the client device can identify and control these sessions. The client device can query and monitor all sessions using the user's "single address", and can identify which devices these sessions are active on by looking at the compound address. This mechanism enables the advanced call control features such as moving a session seamlessly from one device to another. For instance, the client device can request a move of an active communication session with auto answer at the target device from <single address|dynamic address 1> to <single address|dynamic address 2>.

Figure 1A:
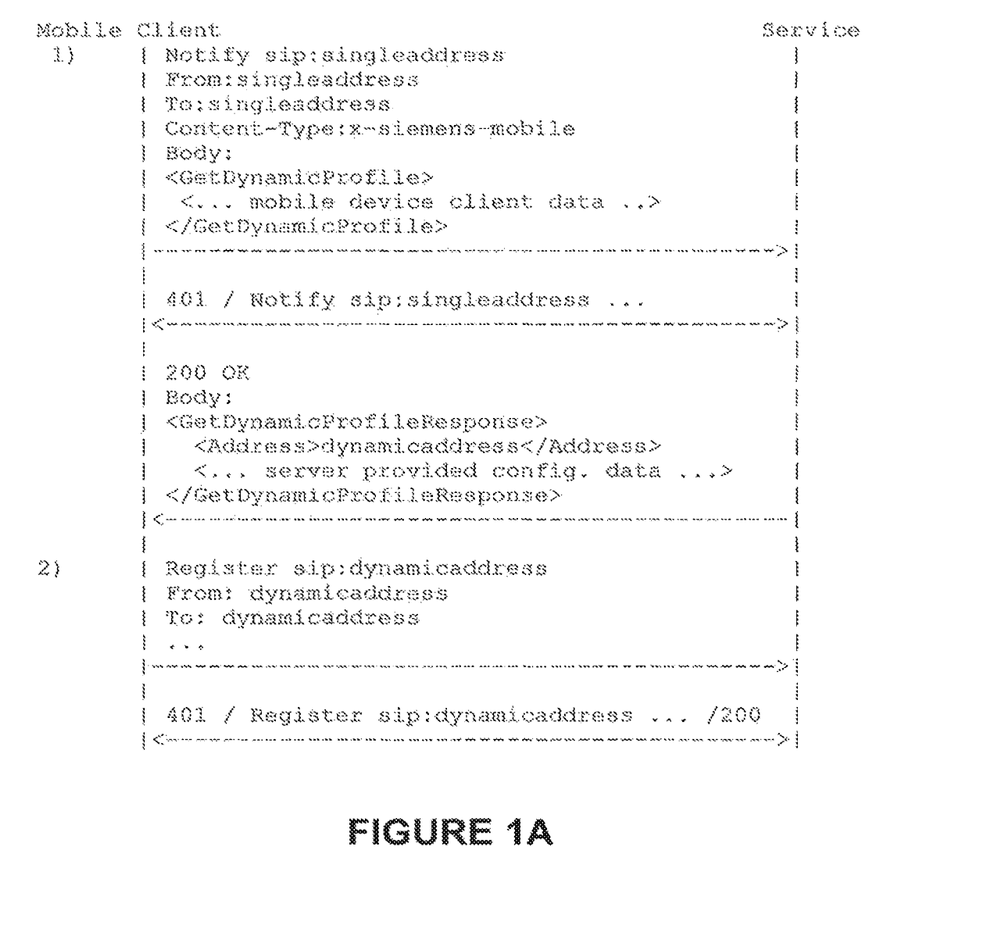
FIG. 1A is a chart containing certain initial steps of an embodiment of a method of Session Initiation Protocol ("SIP") signaling that may be used to perform a dynamic opaque SIP profile assignment at user sign-in upon running of a client application on a client device.
Figure 1B:
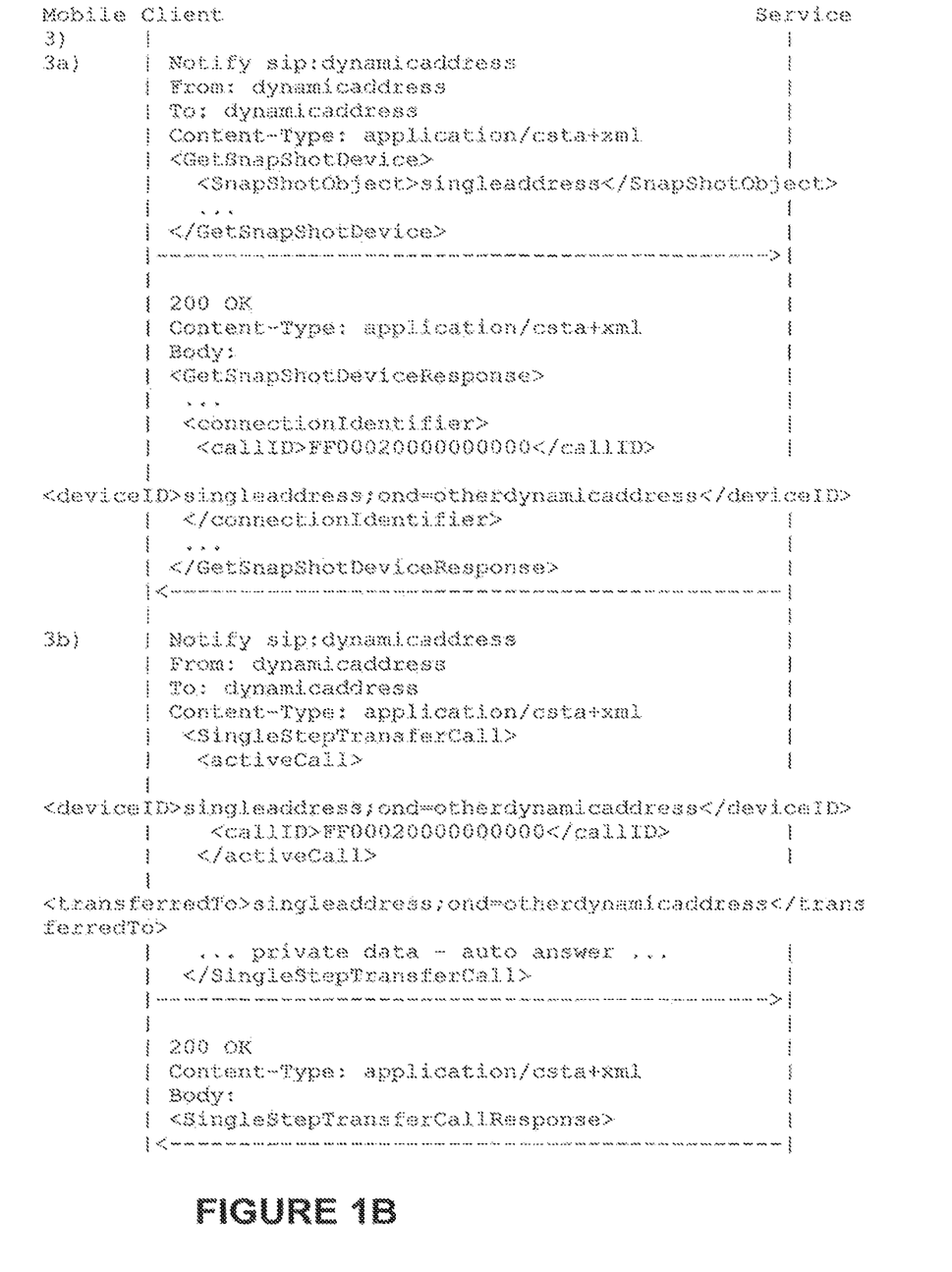
FIG. 1B is a chart similar to FIG. 1A containing certain additional steps of an embodiment of a method of Session Initiation Protocol ("SIP") signaling that may be used to perform a dynamic opaque SIP profile assignment at user sign-in upon running of a client application on a client device. It should be understood that the steps of the method shown in FIG. 1B are subsequent to the steps shown in FIG. 1A.

The method illustrated in FIGS. 1A and 1B provides an example of a practical embodiment of SIP signaling that may be used to perform a dynamic opaque SIP profile assignment at user sign-in upon running of a client application on a client device. In step 1, the client retrieves the dynamic SIP profile with an authenticated/challenged Subscribe/Notify (or blind notify as shown) handshake. The configuration data is sent to the client in an XML body. In step 2, the client uses the profiles data from step 1 to register with the server. The server checks out a dynamic license for the dynamic profile usage. The server assigns the dynamic profile to the user's single address service and creates the compound address<single address|dynamic address>. In step 3, the client retrieves service states (for example active sessions on any other signed-in device the user may have). The client is able to provide output to a user to identify any active sessions so that a user may control any communication sessions on the client device or on any other signed in device the user has previously signed-in on. For instance, as may be appreciated from steps 3a and 3b, a device may communicate with the service to cause a communication session to be moved to another device such that the moving of the active communication session is seamless. It should be understood that the moving of the communication session is seamless such that the moving of the communication session in unlike traditional transfers of phone calls. For instance, unlike a traditional transfer of a call, which would require a terminal to accept a transfer prior to the transferring to take place, a move does not require any prior acceptance as the move occurs seamlessly and the terminal to which the communication session is moved accepts the move immediately without having any verification of an acceptance being required due to the configuration and implementation of the service provided by the server communicating with devices registered with the server. Further, the move operation is transparent to the remote party, who will not be able to identify that the user moved the communication to a new device. The remote party does not receive display updates and does not observe an interruption in the media path. The remote party only sees that he or she is connected to the user's primary address.

Figure 2:
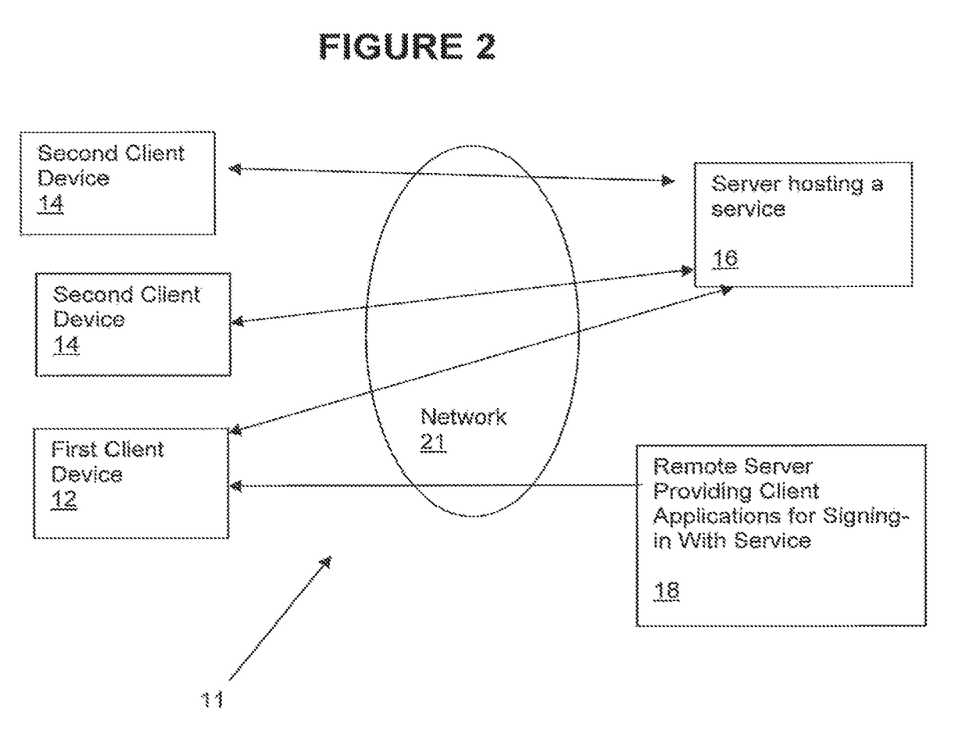
FIG. 2 is a schematic representation of a present preferred embodiment of a communication system illustrating a client device receiving a client application and then signing in with a service via at least one network connection.

Referring to FIG. 2, a communication system 11 may include a first client device 12 and multiple second client devices 14. The client devices 12 and 14 may be connectable to a server 16 that hosts a service via a network 21. The network may be the internet or may be a collection of interconnected networks such as a plurality of interconnected private networks. A remote server 18 that hosts a store service or other service that permits applications to be downloaded to the first client device 12 and second client devices 14 may be available via the network 21 or by another network.

The first client device 12 may communicate with the remote server 18 to download an application. After receiving the application, the first client device 12 may install that application. As part of the installation, a user of the first client device may provide input to the application via an input device of the first client device. The input may include a sign-on name or account name and a password or other access code. The input could also provide other information, such as payment information for the subscriber. The first client device 12 may communicate that input to the server 16 hosting the service. The input could also include the address of the first client device 12. Alternatively, the address of the first client device 12 may be obtained automatically by the application obtaining such information from the memory of the first client device 12.

The server 16 hosting the service may receive the input from the subscriber via one or more messages sent via the first client device 12. The input may include the address of the first client device either as subscriber entered input or automatically obtained information from the memory of the first client device 12. The server 16 may use such input to define a single address service account for the subscriber and assign a single address, or primary service address, to that subscriber.

The server 16 may also authenticate the subscriber so that the first client device 12 is authenticated when running the downloaded application for access to the server and use of the service provided by the server 16. In authenticating the first client device 12. The service hosted by the server may assign a service profile to the first client device 12. The service profile may contain an identification, such as an SIP identification. The SIP identification may be, for example, a dynamic address assigned by the server 16 to the first client device 12.

The first client device 12 may use the service profile received from the service to register with the service. For instance, the first client device 12 may respond to service challenges during registration with the server 16 by providing the server 16 with credentials from the service profile. In response to receiving those credentials, the server 16 may bind the service profile of the first client device 12 to the single address service account of the subscriber. The binding process performed by the server 16 may create a compound address for the first client device 12 that is associated with the subscriber. The compound address may contain both the dynamic address assigned to the first client device 12 and the single address assigned to the subscriber via the service hosted by the server 16. The use of the compound address allows the service to move communications from one device associated with the subscriber to other devices associated with the subscriber that have previously been registered with the service. The dynamic addresses portion of the compound address identifies the device assigned to that dynamic address and the primary address portion of the compound address identifies the subscriber to which that device is associated. By use of the compound addresses, the server 16 is able to identify all the different devices that correspond to a user, or subscriber, with reference to the primary address and dynamic address components of the compound address.

A user may subsequently use the first client device 12 to receive communication sessions initiated to his primary address of the service. The communication sessions may be, for example, voice calls, video calls, or instant messaging sessions. A subscriber may use the first client device to also initiate communication sessions since the use of the compound address allows connection requests to other devices identify both the subscriber and the device to which the subscriber is available for a connection.

The subscriber may also manage active communication sessions via the first client device. The communication sessions that are manageable may include communication sessions active on other client devices the subscriber has previously registered, such as second devices 14. The first client device 12 may query and monitor all communication sessions using the subscriber's primary address assigned by the service so that these sessions may be controlled by the subscriber using the first client device. The downloaded and installed application may be run via the first client device 12 to define the method by which the first client device performs such monitoring and controlling of the communication sessions.

The service may identify to the first client device 12 what communication sessions associated with the user of the first client device 12 are currently active and on which devices associated with that user the sessions are being handled. The service may provide such data via messages sent to the first client device 12 in response to a query from the first client device for such information. Alternatively, such data may be periodically sent by the service to the first client device.

After the first client device 12 has been registered with and authenticated by the server 16 hosting the service, a user may utilize the first client device 12 to manage an active communication session. For instance, a user may provide input to the first client device 12 to move an active communication session using a second client device 14 to another second client device 14 or to the first client device 12. The first client device 12 may provide such a request to the server via one or more messages so that the communication session may be moved in accordance with the directions received via the user input.

In one embodiment, the application run by the first client device 12 for registering with and utilizing the service hosted by the server 16 is a user agent computer supported telecommunications application that permits the first client device 12 to provide third party communication session control. The first client device queries the server 16 to monitor all communication sessions being unitized by other communication devices associated with a subscriber that the subscriber has previously registered with the service, such as the second client devices 14. The different communication devices are identifiable via the compound address that the server 16 assigns to each different device since that address includes the common subscriber primary address and also a unique dynamic address assigned to each device. The first client device 12 can utilize information received from the server and subsequently provide a request to the server 16 to move a particular communication session to another device. Such a request may be a move request message that includes the compound address of the device currently handling an active communication session and the compound address of the device to which the communication session is to be moved. The compound address may identify devices using distinct networking technologies such as analog telephones, cellular phones, or internet enabled devices. Alternatively, such a move request message may include identifiers associated with the different compound addresses to identify those different devices to the server to effectuate the move of the communication session.

Figure 4:
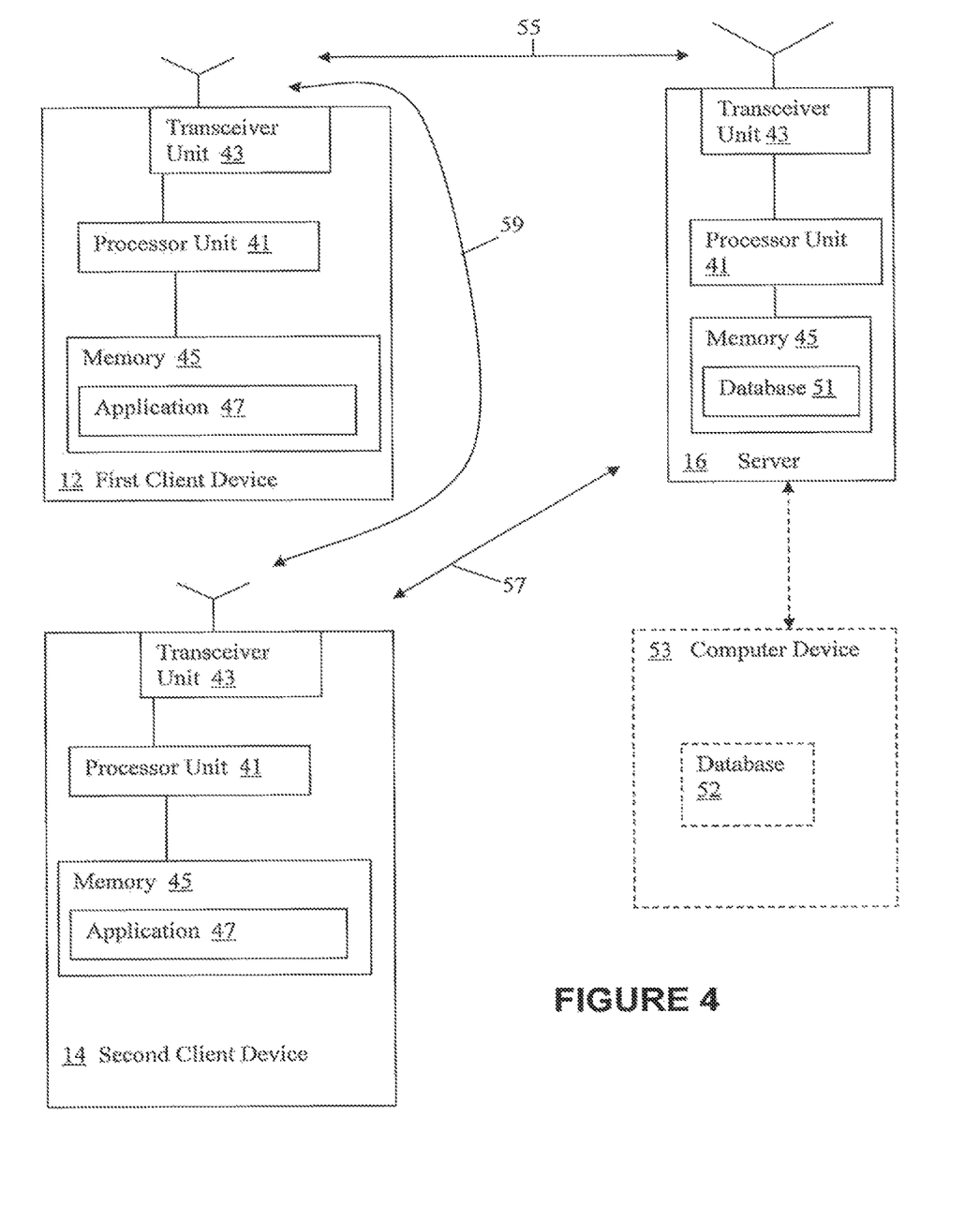
FIG. 4 is a schematic representation of a present preferred embodiment of a communication system.

Additional examples of how the first client device 12 may obtain and use an application for controlling communication sessions will be further discussed below with reference to FIG. 4. The first client device 12, which may be a SIP endpoint or communication terminal such as, for example, a mobile phone, a computer, a laptop, a personal digital assistant, a netbook, or a tablet, may have a processor unit 41. The processor unit 41 may include, for example, one or more microcontrollers, or at least one microprocessor. The processor unit 41 is connected to non-transitory memory 45 that has an application 47 stored thereon. The processor unit 41 runs the application 47 stored on the memory 45. The application 47 may have been obtained via an application store service provided by a remote server 18, as discussed above, or may have been purchased on a computer readable medium that was subsequently used to install the application on the device, such as flash memory drive or other type of storage device having memory that is connectable to the first client device 12. The processor unit 41 is also connected to a transceiver unit 43 that may include a receiver unit and a transmitter unit for transmitting messages to other devices via one or more types of connection paths, such as a wired connection path or a wireless connection path.

The first client device 12 is able to communicate with a server 16 that hosts a service via a first communication path 55. The first communication path 55 may include one or more hops via a network connection or may be a direct connection via a wireless or wired communication path. The server 16 may have a transceiver unit 43 that includes at least one receiver and at least one transmitter for communicating with the first client device 12. The transceiver unit may be connected to a processor. The processor unit 41 may be connected to memory 45 that has a database 51 stored thereon. Alternatively, the database 52 may be accessible to the server via a transmission path that connects the server 16 to a separate computer device 53 as shown in dotted line in FIG. 4.

The server is able to communicate with a second client device 14 that has the application 47 stored in memory 45 connected to a processor unit 41. The application 47 has previously been registered and authenticated with the service hosted by the server 16 via a second communication path 57 as may be appreciated from the above previous discussion of how an application may be downloaded and installed onto a client device. The second client device 14 is able to communicate with the first client device utilizing a transceiver unit 43 connected to the processor unit 41 via a third communication path 59. The second client device 14 may be an SIP endpoint or communication terminal such as, for example, a mobile phone, a computer, a laptop, a personal digital assistant, a netbook, or a tablet computer device.

A user may own or be assigned to the first and second client devices 12 and 14. The user may have previously installed and registered the second client device 14 with the service hosted by the server 16. The user may subsequently utilize the application 47 of the first client device 12 to register and authenticate the first client device 12 with the service hosted by the server 16. For instance, the user may actuate the application so that the processor unit 41 of the first client device 12 runs the application 47 via user input provided to the first client device. Thereafter, the user may provide input to the first client device 12 to send a message to the server 16 so that the first client device 12 may be registered and authenticated with the service hosted by the server 16. In so doing, the user may provide input to the first communication device 12 that is subsequently transmitted to the server to log in to the server to access the user's account. The user's account may be stored in the database 51 of the server 16 or may be stored in a database 52 accessible by the server.

The server 16 may receive the input from the user via the first client device 12. The server 16 may check the licenses available to the user and, if the license limit has not yet been reached, the server 16 may take steps to register the first client device 12 with the service hosted by the server 16 to associate the user to the first client device so that the first client device may utilize the service offered by the server 16.

The licenses that are available may be licenses of different types. Each type of license may define a number of features or the scope of services offered by the service for that license type. The license assigned to the first client device 12 may therefore define the level of service and features provided by use of the service offered by one or more servers 16.

After a user is logged in to the server 16 via the communication between the first client device 12 and the server 16 via first communication path 55, the server 16 may send at least one message along the first communication path 55 to the first client device to assign a dynamic address to the first client device 12 or to assign a compound address to the first client device 12 that includes the primary address of the user of the first client device 12 and also has a dynamic address assigned to the first client device 12 to identify that particular device that corresponds to the user.

It should be appreciated that the server 16 may also send additional information, such as other SIP parameters or other information needed for the first client device to exchange messages with other devices using the service hosted by the server 16. Such parameters or additional information may be dependent upon the type of license acquired by the user. The server 16 could also send other dynamic addresses assigned to other client devices, such as second client device 14 to the first client device 12 for the first client device 12 to communicate with the second client device 14 via the third communication path 59. Such information could all be part of a server profile that is transmitted to the first client device after it is determined that a license is available for the user to register the first client device with the service hosted by the server 16.

The server 16 may monitor communication session activities of the different client devices associated with the user and maintain such data in a database 51 or 52 accessible to the server. The sever may also periodically send messages to the different client devices registered with the service that are associated with the user to update the devices as to the communication session statuses of the other devices. Alternatively, the first communication device 12 may send queries or other messages to the server 16 to obtain statuses of communication sessions ongoing using other client devices associated with the user, such as the second communication device 14.

The first client device may utilize an interface via instructions defined by the application 47 for providing the communication session status information to the user. Examples of such interfaces or displays that may be used to provide such data to a user may be appreciated from U.S. Provisional Patent Application No. 61/419,412 and International Patent Application No. PCT/US11/582348, which was filed on Oct. 28, 2011. The entirety of U.S. Provisional Patent Application No. 61/419,412 is incorporated herein by reference. The entirety of International Patent Application No. PCT/US11/58348 is incorporated herein by reference.

A user may utilize the information displayed or communicated by the first client device 12 relating to the communication sessions to provide input that provides instructions for controlling the handling of the communication sessions. Such input may include a request that is transmitted to the server via first communication path 55 to instruct the server to move an ongoing communication session from one client device associated with the user to another client device associated with that user. The server 16 may receive that instruction and, in response to that instruction, send at least one message to another client device, such as second client device 14, to effectuate the move of the ongoing communication session. Alternatively, the input requesting a move of an ongoing communication session may be included in a request that is directly transmitted from the first client device 12 to another device, such as a second client device 14 via the third communication path 59.

It should be appreciated that the requests for moving a communication session may include the compound addresses of the client device currently handling the communication session and also the compound address of the client device to which the communication session is to be moved. For instance, a request that is directly transmitted may be sent from the first client device to the second client device 14 via third communication path 59 that includes the compound address of the second client device 14 that is currently handling a communication session and the compound address of the first client device 12 to which the communication session is to be moved. The request may also include a command to actuate the moving of the communication session.

It should be appreciated that embodiments of the communication system and communication device discussed above may be modified to meet different design objectives. For instance, the connectivity between a communication device and the service hosted by one or more servers may be direct or through multiple hops. For example, a communication device may communicate to the server hosting the service by sending messages to an access point to be forwarded to the server through one or more gateways or other nodes within one or more networks. It should be understood that the access point may be, for example, a router, a base station, or a switch. The connectivity may be automatically determined based on an automatic configuration mechanism of the device.

Embodiments of the present invention may help eliminate complications so that a user may more easily use his or her devices for engaging in communication sessions. For instance, a user need not know any device addresses or numbers for configuring the other devices the user may have to utilize embodiments of the invention. The user needs only to download and install the application on multiple devices for associating those devices with the user. Upon installing the application, the user may only have to enter the user sign-on code and password for associating his device and having the association stored and recognized by the service. Further, when moving a communication session, a user need not use a device for rejoining any communication sessions or taking other time consuming steps that create noticeable delays to communication session participants when moving a communication session.

While certain present preferred embodiments of the communication device, communication system, and methods of making and using the same have been shown and described above, it is to be distinctly understood that the invention is not limited thereto but may be otherwise variously embodied and practiced within the scope of the following claims.

The invention claimed is:

1. A computer-implemented method for moving an active communication session, comprising:
  assigning a first compound address to a first device, the first compound address comprising:
    a primary address assigned to a user, and
    a first dynamic address assigned to the first device;
  assigning a second compound address to a second device, the second compound address comprising:
    the primary address assigned to the user, wherein the primary address is the same in the first compound address and the second compound address, and
    a second dynamic address assigned to the second device;
  sending a message identifying an existing active communication session associated with the user to a third device; and
  receiving an active communication session move request message from the third device, the move request message including:
    a request to move the active communication session to the first device or the second device; and
    the first compound address of the first device or the second compound address of the second device.

2. The computer-implemented method of claim 1, further comprising:
  receiving a registration request, and wherein registering the first device and the second device is in response to receiving the registration request.

3. The computer-implemented method of claim 2, wherein assigning the first dynamic address to the first device is in response to a registration of the first device.

4. The computer-implemented method of claim 2, wherein assigning the second dynamic address to the second device is in response to a registration of the second device.

5. The computer-implemented method of claim 2, wherein sending the message identifying the active communication session is in response to a registration of the first device or the second device.

6. The computer-implemented method of claim 1, further comprising:
  moving the active communication session from the first device to the second device while the active communication session is ongoing.

7. The computer-implemented method of claim 6, wherein the active communication session is moved from the first device to the second device without further action from the user.

8. A system for moving an active communication session, the system comprising:
  a processor;
  a non-transitory memory operatively connected to the processor and storing instructions that, when executed by the processor, cause:
    assigning a first compound address to a first device, the first compound address comprising:
      a primary address assigned to a user, and
      a first dynamic address assigned to the first device;
    assigning a second compound address to a second device, the second compound address comprising:
      the primary address assigned to the user, wherein the primary address is the same in the first compound address and the second compound address, and
      a second dynamic address assigned to the second device;
    sending a message identifying an active communication session associated with the user to a third device; and
    receiving an active communication session move request message from the third device, the move request message including:
      a request to move the active communication session to the first device or the second device; and
      the first compound address of the first device or the second compound address of the second device.

9. The system of claim 8, wherein the non-transitory memory stores further instructions that cause:
  receiving a registration request, and wherein registering the first device and the second device is in response to receiving the registration request.

10. The system of claim 9, wherein the non-transitory memory stores further instructions that cause:
  assigning the first dynamic address to the first device is in response to a registration of the first device.

11. The system of claim 9, wherein the non-transitory memory stores further instructions that cause:
  assigning the second dynamic address to the second device is in response to a registration of the second device.

12. The system of claim 9, wherein the non-transitory memory stores further instructions that cause:
  sending the message identifying the active communication session is in response to a registration of the first device or the second device.

13. The system of claim 8, wherein the non-transitory memory stores further instructions that cause:
  moving the active communication session from the first device to the second device while the active communication session is ongoing.

14. The system of claim 13, wherein the active communication session is moved from the first device to the second device without further action from the user.

15. A non-transitory, computer-readable medium storing a set of instructions that, when executed by a processor, cause:
- assigning a first compound address to a first device, the first compound address comprising:
  - a primary address assigned to a user, and
  - a first dynamic address assigned to the first device;
- assigning a second compound address to a second device, the second compound address comprising:
  - the primary address assigned to the user, wherein the primary address is the same in the first compound address and the second compound address, and
  - a second dynamic address assigned to the second device;
- sending, a message identifying an active communication session associated with the user to a third device; and
- receiving an active communication session move request message from the third device, the move request message including:
  - a request to move the active communication session to the first device or the second device; and
  - the first compound address of the first device or the second compound address of the second device.

16. The non-transitory, computer-readable medium of claim 15, wherein the non-transitory, computer-readable medium stores a further set of instructions that cause:
- receiving a registration request, and wherein registering the first device and the second device is in response to receiving the registration request.

17. The non-transitory, computer-readable medium of claim 16, wherein the non-transitory, computer-readable medium stores a further set of instructions that cause:
- assigning the first dynamic address to the first device is in response to a registration of the first device.

18. The non-transitory, computer-readable medium of claim 16, wherein the non-transitory, computer-readable medium stores a further set of instructions that cause:
- assigning the second dynamic address to the second device is in response to a registration of the second device.

19. The non-transitory, computer-readable medium of claim 15, wherein the non-transitory, computer-readable medium stores a further set of instructions that cause:
- moving the active communication session from the first device to the second device while the active communication session is ongoing.

20. The non-transitory, computer-readable medium of claim 19, wherein the active communication session is moved from the first device to the second device without further action from the user.

* * * * *